United States Patent
Amico

[19]

[11] Patent Number: 5,701,966
[45] Date of Patent: Dec. 30, 1997

[54] OMNIDIRECTIONAL SELF-PROPELLED VEHICLE FOR GROUND HANDLING OF EQUIPMENT

[75] Inventor: Peter Amico, Vineland, N.J.

[73] Assignee: Air Tracks, Inc., Vineland, N.J.

[21] Appl. No.: 584,428

[22] Filed: Jan. 11, 1996

[51] Int. Cl.$^6$ .......................... B62D 11/04; B62D 57/00
[52] U.S. Cl. .................. 180/7.2; 180/6.66; 180/191; 180/904; 414/495
[58] Field of Search .................. 180/7.1, 7.2, 6.2, 180/6.48, 6.5, 6.62, 6.66, 19.1, 904; 414/495; 254/4 R, 4 B, 4 C; 244/50

[56] References Cited

U.S. PATENT DOCUMENTS

| | | |
|---|---|---|
| 1,391,773 | 9/1921 | Forbes .......................... 254/4 C |
| 2,641,423 | 6/1953 | Harriman et al. .................. 244/100 R |
| 2,651,498 | 9/1953 | Straub .......................... 254/127 |
| 3,119,502 | 1/1964 | Paul .......................... 414/474 |
| 3,279,722 | 10/1966 | Glover et al. .................. 244/50 |
| 3,552,556 | 1/1971 | Hall .......................... 414/495 |
| 3,740,020 | 6/1973 | Ames .......................... 254/134 |
| 3,746,112 | 7/1973 | Ilon .......................... 180/6.2 |
| 3,761,040 | 9/1973 | Cummins .......................... 244/2 |
| 3,876,255 | 4/1975 | Ilon .......................... 301/5.23 |
| 3,880,310 | 4/1975 | Hunziker .......................... 414/495 |
| 3,882,885 | 5/1975 | McCain .......................... 180/7.1 X |
| 3,937,290 | 2/1976 | Benning .......................... 180/14.7 |
| 4,033,422 | 7/1977 | Benning .......................... 180/14.1 |
| 4,223,856 | 9/1980 | DiVincenzo .......................... 244/50 |
| 4,488,612 | 12/1984 | Patterson .......................... 180/14.1 |
| 4,516,744 | 5/1985 | Burnside .......................... 244/17.17 |
| 4,534,544 | 8/1985 | Heide .......................... 254/9 C |
| 4,576,245 | 3/1986 | Oldani .......................... 180/14.1 |
| 4,598,782 | 7/1986 | Ilon .......................... 180/7.1 |
| 4,603,869 | 8/1986 | Maxwell .......................... 280/11 |
| 4,629,391 | 12/1986 | Soyk et al. .......................... 414/563 |
| 5,056,981 | 10/1991 | Knowles .......................... 414/495 |

FOREIGN PATENT DOCUMENTS

| | | |
|---|---|---|
| 802885 | 2/1951 | Germany. |
| 812631 | 9/1951 | Germany. |
| 3-279081 | 12/1991 | Japan .......................... 180/7.2 |

Primary Examiner—Kevin Hurley
Attorney, Agent, or Firm—Pollock, Vande Sande & Priddy

[57] ABSTRACT

Self-propelled vehicle for ground handling of equipment supportable by a pair of skids engageable by a lifting element and a stabilizing element. The vehicle has a front chassis rotatably connected to a rear chassis for relative tilting movement in a plane transverse to a longitudinal vehicle axis. Each chassis is supported by a pair of independently driven omnidirectional wheels for movement of the vehicle over the ground in any azimuthal direction. Mounted on the rear chassis is a lift assembly of adjustable transverse width for engaging the skids with the lifting elements and lifting the equipment to an elevated position for transport over the ground. A stabilizer assembly of adjustable transverse width is also mounted on the rear chassis, but extends through and in front of the front chassis for engaging the skids with the stabilizing elements to prevent fore/aft teetering movement of the elevated equipment.

24 Claims, 5 Drawing Sheets

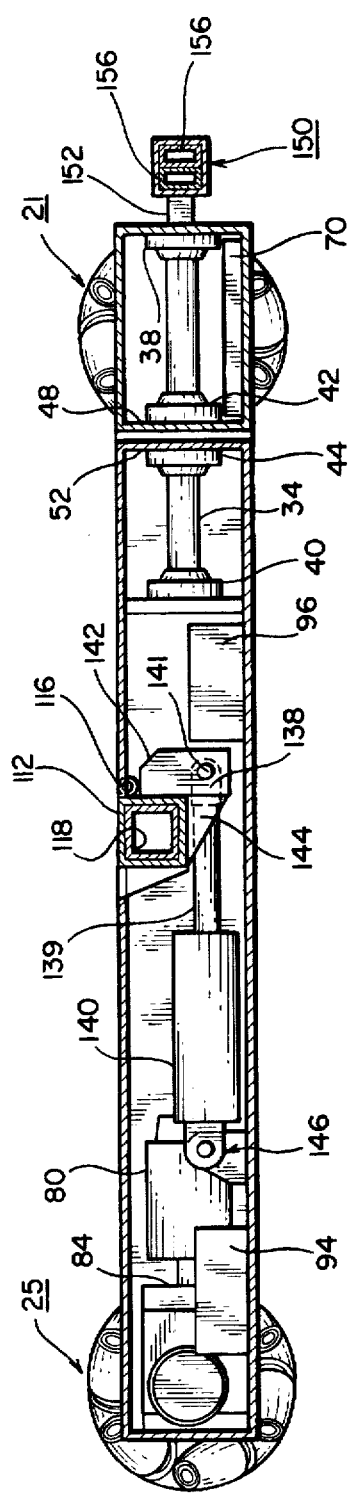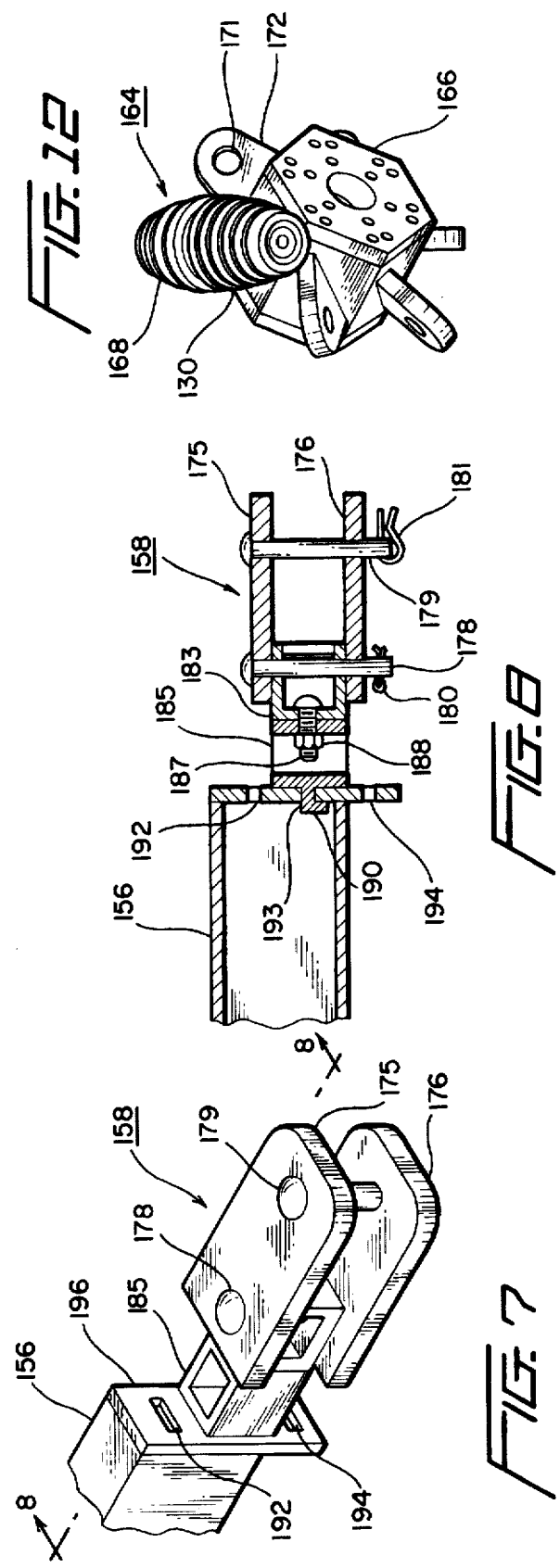

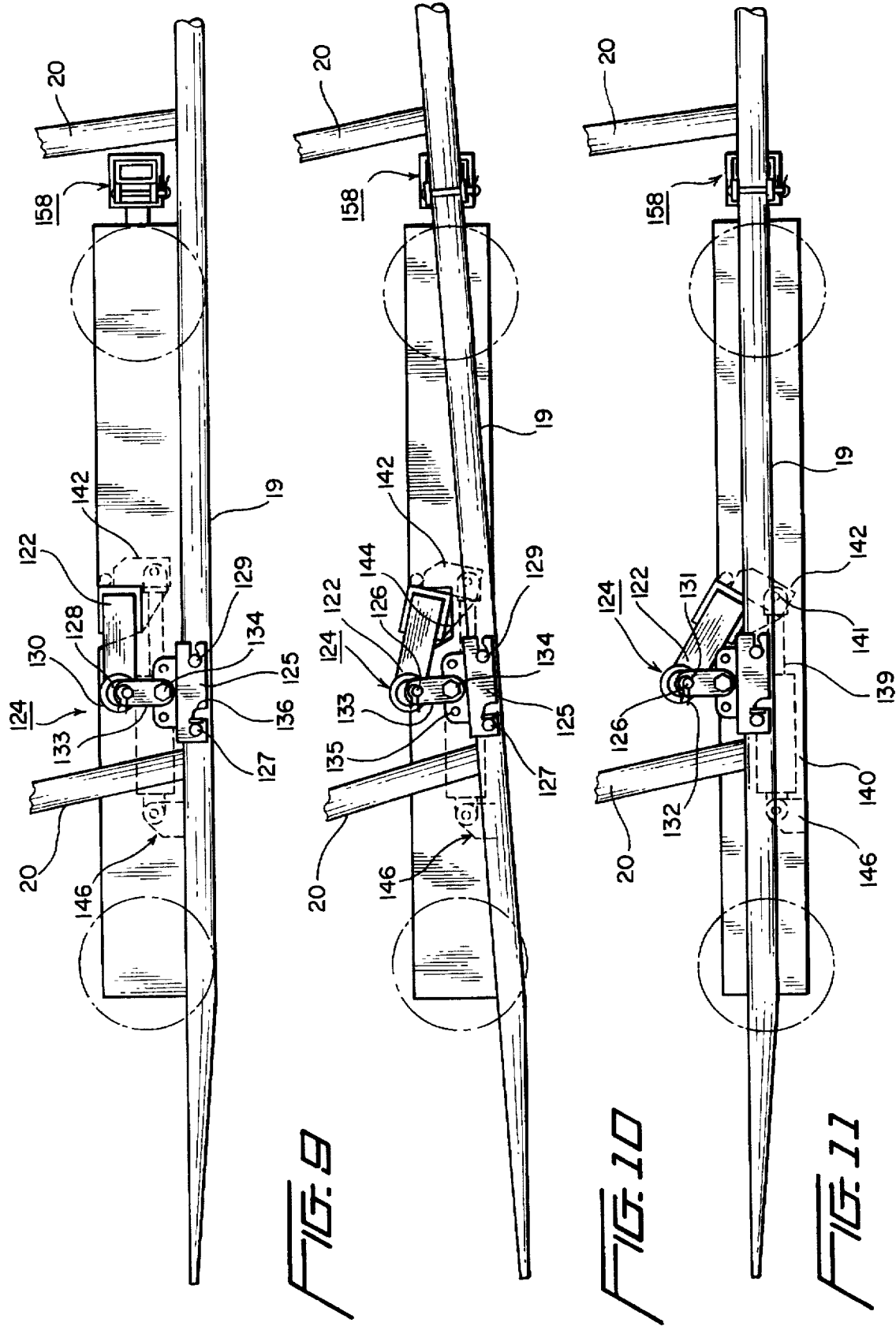

OMNIDIRECTIONAL SELF-PROPELLED VEHICLE FOR GROUND HANDLING OF EQUIPMENT

FIELD OF THE INVENTION

The invention relates generally to devices for the ground handling of ground supported equipment, and more specifically to devices for lifting and transporting equipment having at least one ground engaging member, such as a helicopter equipped with skid type landing gear. However, the invention is applicable to handling other types of aircraft and other equipment supported by ground engaging members, including both wheel and skid types.

BACKGROUND OF THE INVENTION

There are special considerations involved in handling helicopters while they rest on the ground. Because they lift off vertically, they do not require landing gears with wheels, and are often equipped with landing skids instead of wheels. In addition, the use of skids instead of non-retractable landing gears with wheels avoids the drag created by the latter ground engaging means.

Furthermore, the main rotor employed by many helicopters is not adapted to move such a vehicle easily while it is on the ground. Thus, even when such helicopters are equipped with wheels of the prior art, it is not easy or practical for one person to move the helicopter while it is on the ground.

Helicopters are used extensively by military forces in the transportation of personnel and supplies between local and remote areas. Near landing areas of restricted size, such as may be available on ships, it is often desirable to store a plurality of helicopters in the smallest possible storage area, which may place severe restrictions on the maneuverability of the helicopter when it is being moved from its landing area into its place of storage.

One typical means in the past of maneuvering a helicopter with skid type landing gear was to attach to the skids ground handling wheels supplied by the manufacturer. A disadvantage of such an arrangement is that more than one person may be required, depending on the size of the helicopter, to attach the wheels and then move the wheel mounted helicopter into a hangar or other storage area. In addition, such wheels are unidirectional so that it is very difficult to position the helicopter laterally. Also, when attaching and removing wheels of the cantilevered type, the operator may be subject to serious injury should an improperly set wheel cause the cantilever arm to spring back under the weight of the helicopter. Where the wheels to be attached are of the hydraulic type, the corresponding equipment is very expensive and their installation requires excessive amounts of time.

Another prior ground handling device is a mobile platform on which a helicopter may land and then be towed to another location, such as a hangar for storage. Such landing platforms, although capable of being handled by a single person with a power towing unit where the helicopter is relatively small, also have numerous disadvantages. For example, a platform is required for each helicopter, and each platform takes up valuable hangar space because it is wider than the helicopter itself. The height added by the platform may also cause interference with overhead structures, such as hangar doors. Furthermore, the helicopter must be operated and hovered onto the platform, and landing on the platform can be dangerous because of its small size, especially under adverse weather conditions such as gusty or high crosswinds.

Other prior ground handling devices include hydraulic lifting and towing devices specifically designed to accommodate only helicopters with a particular size or design of landing skid. For example, the lifting device may have vertically extending support members that must be lined up with and engage the base of skid supporting cross tubes under the fuselage of the helicopter. Should the operator misalign one or more of the support members, there is the danger of pushing the distal ends of the support members through the fuselage of the helicopter, or the helicopter may inadvertently fall off of one or more of the support members, causing them to puncture the fuselage, either of these events resulting in costly damages.

SUMMARY OF THE INVENTION

It is therefore an object of the present invention to overcome the foregoing disadvantages of the prior art by providing a self-propelled vehicle capable of lifting and then transporting skid supported equipment in all directions (omnidirectional), and controllable remotely by a single person using a tethered or radio controller. Omnidirectional wheels permit the self-propelled vehicle and its equipment lifting device to be movable in any desired azimuthal direction. These wheels embody improvements described in U.S. Pat. Nos. 3,746,112 and 3,876,255 to Ilon, the entire contents of these patents being expressly incorporated herein by reference. The present invention itself is an improvement over the helicopter ground handling equipment described in U.S. Pat. No. 4,223,856 to DiVincenzo, the entire contents of which are expressly incorporated herein by reference.

A further object of the invention is to provide a single helicopter handling device capable of lifting and towing a wide variety of helicopters with skids of various types. It is also an object of this invention to provide a helicopter handler that is easy to install and remove by being readily attachable to existing lifting or wheel attachment points on a wide variety of conventional helicopter designs.

Another object of the invention is to facilitate such ease of installation and removal by providing skid adapters and reusable yokes whereby a single person can readily attach to the skid assembly of a skid-equipped helicopter of conventional design a ground transport assembly having an hydraulic lifting device mounted on a powered vehicle chassis operable by the same person for lifting and transporting the helicopter in a stable and safe fashion.

To achieve the foregoing objects and advantages, the present invention provides a universally useable ground handling apparatus for lifting and moving skid type helicopters while on the ground or on some other supporting surface, such as the deck of a ship. The improved self-propelled helicopter handling vehicle of the present invention has a two part chassis comprising a front chassis pivotally connected to a rear chassis. A laterally adjustable lift assembly and a laterally adjustable stabilizer assembly are mounted on the rear chassis. However, mounting bars of the stabilizer assembly extend through the front chassis such that the operable parts thereof are carried at the front of the vehicle. The rear chassis and the front chassis each have a pair of ground engaging omnidirectional wheels, the wheels of each pair being on opposite sides of the corresponding chassis. Each wheel is driven by an independent motor and transmission such that there are two motor units and two transmission units on each chassis.

The helicopter handler thus comprises a highly mobile ground vehicle that is self-propelled and low to the ground so as to be easily positioned under a helicopter (including those with an antennae mounted on their undercarriages), and that has a lift assembly with easily positioned extensible arms each having a removable yoke for temporarily engaging wheel mounting elements on the skids. An hydraulic lifting device is mounted on the vehicle for engaging the arms to raise and carry the helicopter. Upon being thus supported by the lifting device, the helicopter is readily movable in any azimuthal direction by the device's omnidirectional wheels which are driven independently with respect to both their speed and direction of rotation.

The lift assembly includes an hydraulic lifting mechanism comprising a motor, a pump, a fluid reservoir, a cylinder and a piston. The motor for the hydraulic lifting mechanism and the separate motors for each of the wheels are remotely controlled by a hand held controller that communicates with an onboard computer either by radio or by means of a tether in the form of a flexible electrical cable. The front chassis and the rear chassis are interconnected by a pivot axle so as to be tiltable relative to each other in a plane transverse to the longitudinal axis of the vehicle. The purpose of this pivotal connection is to insure continuous contact between all four wheels and the underlying ground or other supporting surface where the supporting surface is uneven.

Another feature of the invention is that the ground handling apparatus is adaptable for use on a majority of helicopters with skid type landing gear of various designs. For this purpose, the invention provides a universal engaging member for engaging different adapters or yokes, each of which is specially designed for and can be quickly and easily installed on the skids of a corresponding one of a variety of different model helicopters. Preferably, the adapters or yokes used for lifting are first secured to a universal engaging member, such as a pin, and then are connected to the ground handling wheel attachment points common to skid type helicopters.

In a preferred embodiment, the apparatus of the invention employs a lift assembly comprising a lifting tube carrying telescoping tubular extensions which are adaptable to engage helicopter skids of various widths. The telescoping tubular extensions are connected to the skids through lifting yokes attached to the wheel attachment points so that the helicopter can be lifted and transported without placing stress on any points other than those points which are specifically designed for carrying the helicopter load without undue stress and in accordance with the manufacturer's specifications. A second telescoping tubular assembly is provided in spaced relation to the first telescoping tubular assembly to provide a stabilizer assembly having extensible arms for engaging a forward portion of the helicopter skids as an anti-teetering device.

The extensible lift tube and the extensible stabilizer tube of the invention enable a single person to install and interconnect the lifting device with the respective skids of small to medium size helicopters, and then to raise and transport the helicopter by means of the thus connected omnidirectional vehicle. The invention also may be connected to and used to lift and transport large helicopters, although this handling may require more than one person. The lifted and transported helicopter can be placed wherever desired, and then both the yoke and the transport vehicle may be readily disconnected for reuse in moving another helicopter.

Both the lift assembly and the stabilizer assembly are made with extensible arms of adjustable width so that one of each of these assemblies can be provided for use with the skids on all conventional helicopters. The arms of the lift assembly have at their outermost (distal) ends a universal engaging member adapted to engage lifting elements specifically designed for each particular type of helicopter. In some instances, such as those where the helicopter is provided with wheel mounting elements capable of receiving a wheel axle, the lifting element according to the present invention is a yoke made with skid engaging means that directly engage the wheel mounting elements already present on the skids. On the other hand, the stabilizer assembly includes a universally adjustable stabilizing element or yoke designed for engaging a plurality of different types of helicopter skids.

In readying the invention for use, the skid lifting yokes that match the particular helicopter design are attached to universal engaging pins at the distal ends of the lift assembly arms. Then, an operator simply maneuvers the self-propelled vehicle under the helicopter and between the skids, preferably from the rear of the helicopter and parallel to the skids. The lifting yokes are then engaged by extending the telescoped lift tube extensions and inserting the wheel mounting elements on the skids into apertures or other receptacles in the lifting yokes.

If the point of attachment between the universal engaging member and the lifting yoke is slightly forward of the center of gravity of the helicopter, the hydraulic lifting device is then operated to tilt the helicopter and raise a front portion of the helicopter skids clear of the ground to permit extension and attachment of the yokes on the telescoped tubular extensions of the stabilizer assembly. If the point of attachment is substantially at or slightly aft of the center gravity, then the helicopter may be easily tilted downward at the rear to raise the front portion of the skids for attachment of the stabilizer yokes.

After the stabilizer yokes are attached to the skids, the hydraulic lifting mechanism is again operated to lift the helicopter skids entirely clear of the ground and into position for transport. In this transport position of the helicopter, the attached stabilizer assembly serves as an anti-teetering device for steadying the helicopter while it is moved over the ground or deck, or into a hangar or other building.

BRIEF DESCRIPTION OF THE DRAWINGS

The invention and its operation and advantages may be further understood from the detailed description below of specific embodiments taken in conjunction with the accompanying drawings, in which:

FIG. 6 is an elevational sectional view taken longitudinally along lines 6—6 of FIG. 2;

FIG. 7 is a perspective view illustrating details of the stabilizer yoke;

FIG. 8 is a sectional view of the stabilizer yoke taken along lines 8—8 of FIG. 7;

FIGS. 9, 10 and 11 are diagrammatic elevational side views illustrating sequential steps by which the invention engages the helicopter skids and lifts the helicopter to an elevated position off of the ground for transport; and, FIG. 12 is a perspective view illustrating details of a modified roller usable on an omnidirectional wheel for the self-propelled vehicle of the invention.

DETAILED DESCRIPTION OF THE PREFERRED EMBODIMENTS

Figure 1:
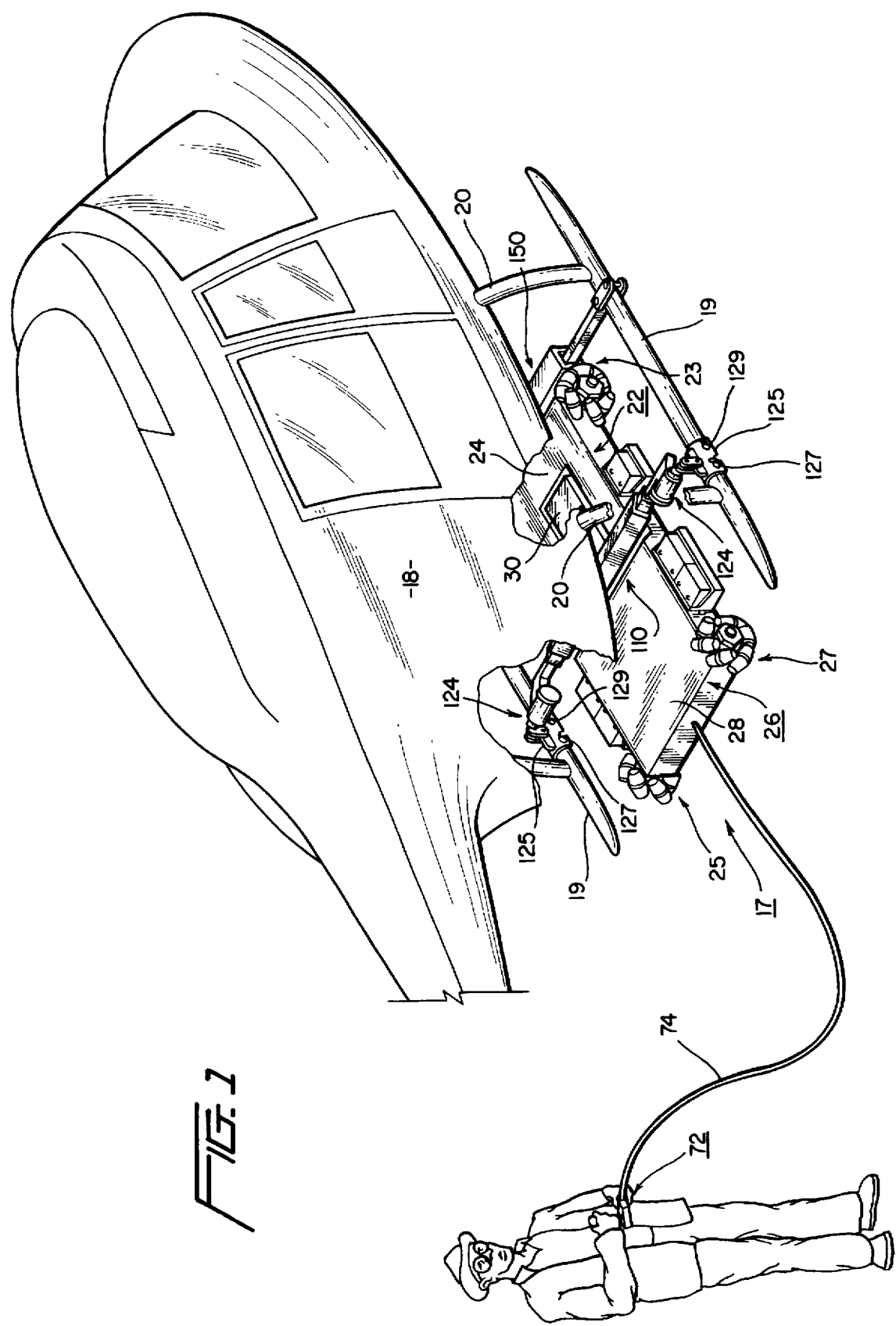
FIG. 1 is a perspective view of a helicopter being transported by the omnidirectional self-propelled vehicle of the invention.

Referring now to FIGS. 1–6 of the drawings, there is shown a helicopter handling vehicle, generally designated 17, made in accordance with the present invention for lifting and transporting a helicopter 18 by its skids 19,19, which are attached to the helicopter fuselage by cross tubes 20, 20. The body of the vehicle comprises a front chassis 22 having a frame 24 in the general shape of a U, and a rear chassis 26 having a frame in the general shape of a bottle with base 28 and a forwardly projecting neck 30. The front and rear chassis are rotatably connected together to form the overall body, which in turn is supported for movement in any azimuthal direction over the ground or other underlying surface by means of specially designed and oriented omnidirectional wheels 21, 23, 25 and 27, the construction, arrangement and operation of which are described more specifically below.

The front chassis 22 is entirely independent of the rear chassis 26 except for the rotational connection, generally designated 32, comprising a pivot axle 34 extending between the forward end of the rear chassis neck 30 and the base 36 of the U-shaped front frame 24. Pivot axle 34 is rotatably mounted in thrust bearings 38 and 40 at its respective ends and in intermediate rotary bearings 42 and 44. Thrust bearing 38 and rotary bearing 42 are secured respectively to the front wall 46 and the rear wall 48 of front chassis 22, and thrust bearing 40 and rotary bearing 44 are secured respectively to an intermediate wall 50 and a front wall 52 of the neck portion 30 of rear chassis 26. The rotational connection 32 between the front chassis 24 and the rear chassis 26 permits relative pivotal or tilting movement between these two chassis for insuring that a ground engaging surfaces on the rollers of each of the omnidirectional wheels 21, 23, 25 and 27 remain at all times in contact with the ground or other supporting surface over which vehicle 17 is to travel.

Mounted on front platform 24 are an electric motor 56 connected to a transmission 58 for driving a left front axle 59 on which is mounted omnidirectional wheel 21, and an electric motor 60 connected to a transmission 62 for driving a right front axle 63 on which is mounted omnidirectional wheel 23. Also mounted on the front chassis 22 by means of corresponding brackets are two 12 volt batteries 65 and 67, and an onboard computer 70 which is connected to a hand held remote control module 72 by a tether 74 comprising electrical control wires. The tether 74 may be eliminated by including a radio transmitter in the remote control module 72 and a radio receiver in the computer 70 for conveying the same control signals from the module to the computer.

The remote control module 72 comprises an on/off switch 73, a 360° tiltable joy stick 76 for controlling vehicle direction and speed, and a fore/aft toggle switch 78 for controlling the raising and lowering of the helicopter lift assembly described further below. The signals produced by movement of joy stick 76 are such that the direction of the vehicle depends on the direction in which joy stick 76 is pushed and the speed of the vehicle depends on how hard joy stick 76 is pushed away from its vertical rest position. In other words, the harder the joy stick 76 is pushed in a given direction, the faster the vehicle travels in that direction up to its maximum design speed.

The components mounted on the rear chassis 26 include an electric motor 80 connected to a transmission 84 for driving a left rear axle 86 on which is mounted omnidirectional wheel 25, and an electric motor 88 connected to a transmission 90 for driving a right rear axle 92 on which is mounted omnidirectional wheel 27. A battery 94 is mounted on the base portion of rear chassis 26, a battery 96 is mounted on the neck portion of rear chassis 26, additional batteries 98 and 99 are mounted on the left side of rear chassis 26 by a bracket 101, and additional batteries 103 and 104 are mounted on the right side of rear chassis 26 by a bracket 106.

Also mounted on rear chassis 26 is a lift assembly, generally designated 110. Lift assembly 110 comprises a main lift tube 112 and an inner reinforcing transverse tube 118, each having a rectangular cross section and pivotally mounted on a forward wall 114 of rear chassis 26 by a pair of hinges 116, 116. Telescoped for sliding movement within each end of transverse tube 118 is an extension tube 120, the latter being connected by a lever arm 122 to a fitting 124 for engaging a lifting yoke 125, which is mounted on a corresponding skid of the helicopter 18 by engaging two pairs of wheel mounting studs 127,127 and 129,129, one stud of each pair being on opposite sides of the skid as shown in FIGS. 1 and 9–11.

Figure 2:
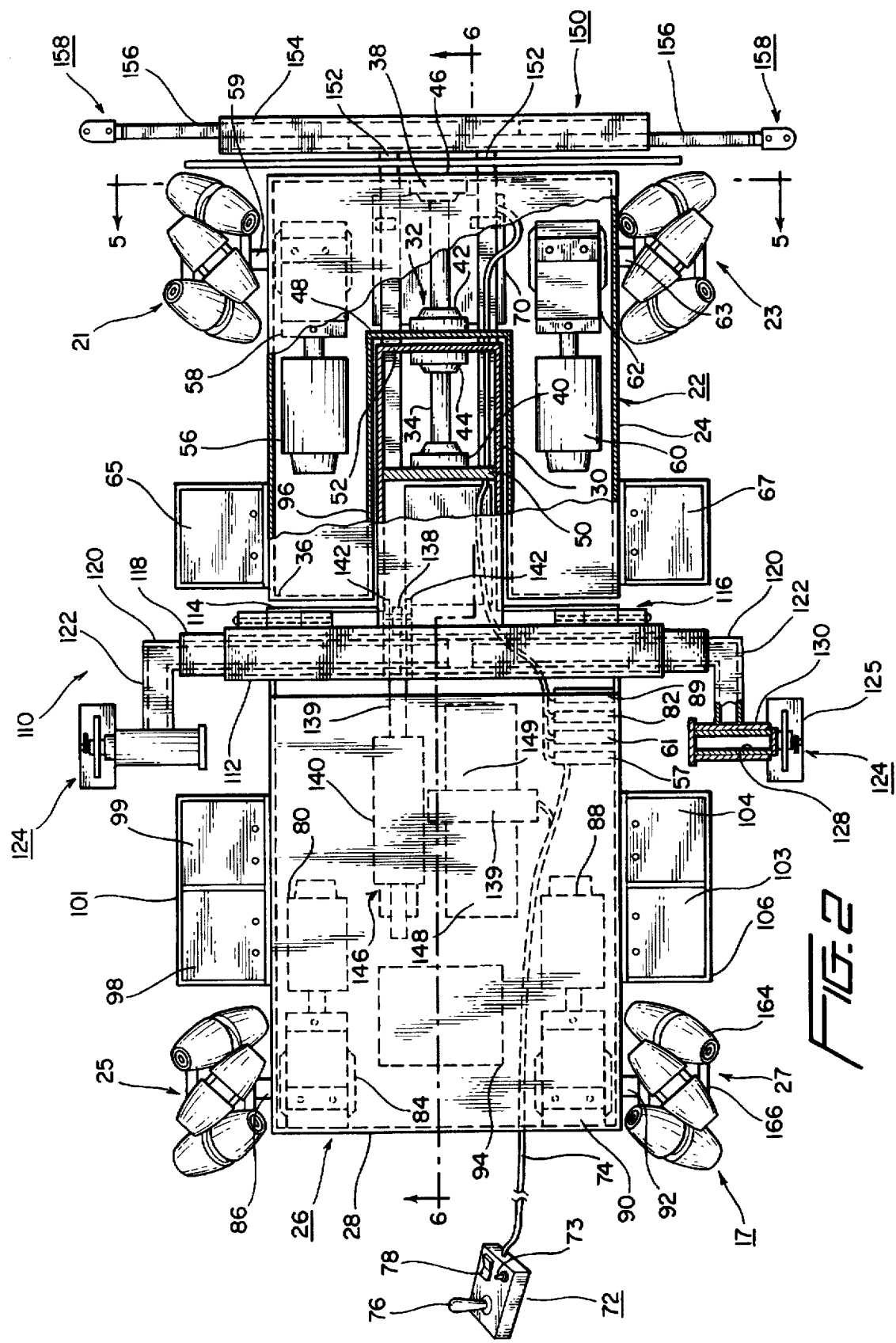
FIG. 2 is a partially sectioned plan view of the omnidirectional self-propelled vehicle of FIG. 1.
Figure 3:
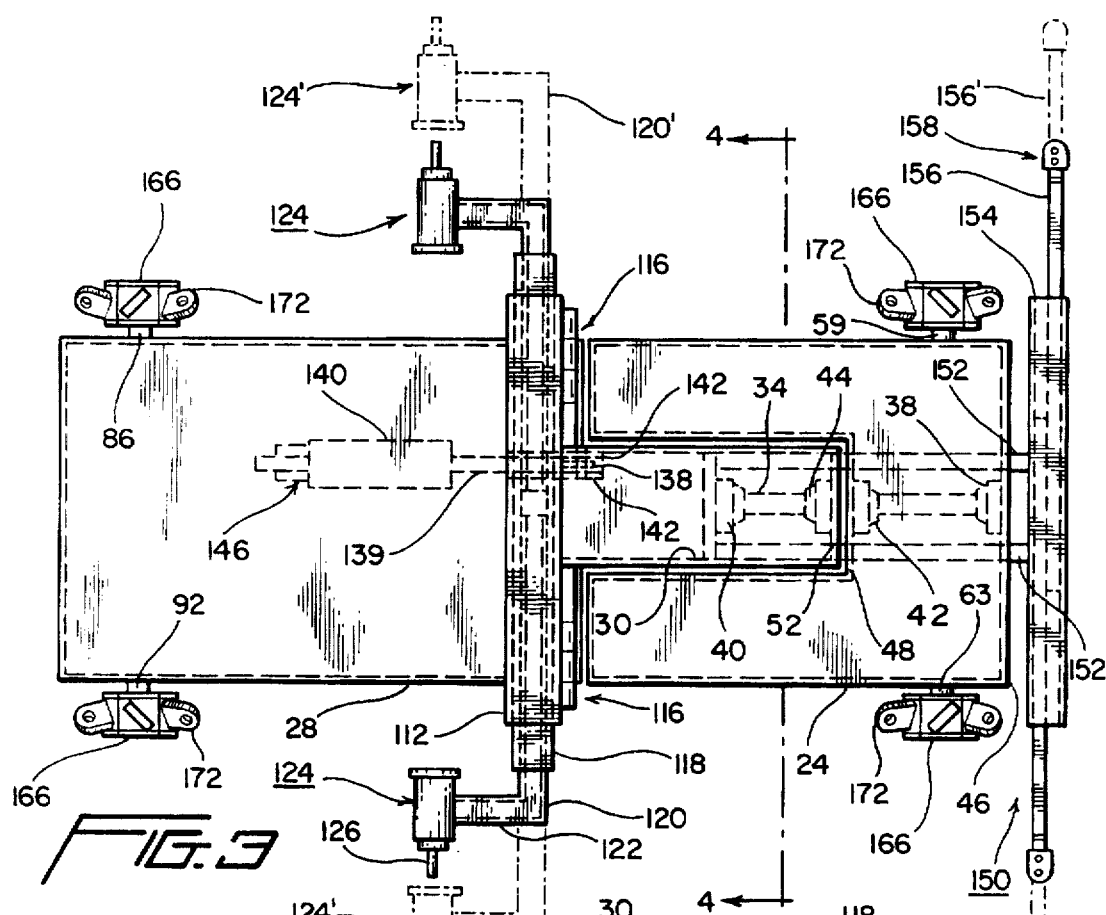
FIG. 3 is a plan view of the omnidirectional self-propelled vehicle with some of the components removed for clarity, and illustrating the extensible features of the aft lift assembly and the forward stabilizer assembly.
Figure 4:
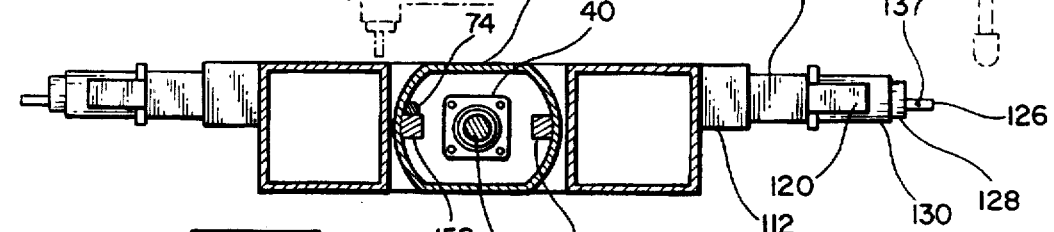
FIG. 4 is an elevational sectional view taken transversely along lines 4—4 of FIG. 3.

As shown best in FIG. 2, fitting 124 comprises a yoke engaging lift pin 126 welded to the closed end of a pipe or other metal cylinder 128 that is rotatably carried within an outer pipe or other metal cylinder 130, such that weight placed on lift pin 126 causes it to seek the lowest point relative to outer pipe 130. As shown in FIGS. 5 and 9–11, lift pin 126 extends through an aperture 131 in one end of a link 133 and is pivotally secured to this link by a releasable spring pin 132 which passes through a transverse aperture 137 near the lift pin's distal end (FIG. 4). The other end of link 133 is pivotally connected to the yoke 125 by a bolt 134, which may be secured in any one of a series of three yoke apertures 135. Preferably, the selected aperture is slightly forward of the center of gravity of the helicopter to be lifted.

For purposes of pivoting lift tube 112 and the extensible structures carried at opposite ends thereof, the distal end 138 of the piston rod 139 of an hydraulic unit 140 is pivotally connected to lift tube 112 by a pin 141 which extends between a pair of pivot plates 142, 142 and passes through an aperture in the distal end of the piston rod. Pivot plates 142, 142 are welded to the forward side of lift tube 112 and reinforced by a triangular brace 144 welded to the underside of lift tube 112 as may be seen best in FIG. 6. The rear end of the hydraulic unit 140 is pivotally secured to the rear chassis 26 by a second pivot connection 146.

Also carried by rear chassis 26 are an hydraulic motor 148 and a motor controller 139 for driving an hydraulic pump 149, which includes a fluid reservoir and is connected by appropriate hydraulic lines (not shown) to the hydraulic unit 140, the latter comprising a conventional piston and cylinder combination. Mounted on the right sidewall of rear chassis 26 is a series of motor controllers and amplifiers 57, 61, 82 and 89 for generating control signals under the control of computer 70 for operating the wheel drive motors 56, 60, 80 and 88, respectively.

A stabilizer assembly, generally designated 150 is mounted on the neck portion 30 of rear chassis 26 by means of a pair of fixed parallel support bars 152, 152. The rear ends of support bars 152, 152 are fixed, preferably by welding, to the platform of rear chassis neck portion 30, and the front end of support bars 152, 152 are fixed, preferably by removable bolts or the like, to a transversely extending support tube 154. Slidably mounted within opposite ends of support tube 154 are a pair of extensible stabilizer tubes 156, 156, each having at its distal end a stabilizer yoke 158 adapted to be readily attached to and released from a forward portion of a helicopter skid for stabilizing the helicopter against seesaw like teetering movement during the lifting thereof by the lift assembly as described more fully below.

The detailed structural features of skid yoke 158 are shown in FIGS. 7 and 8. The yoke 158 includes a pair of opposed clamping plates 175 and 176 which may be secured together by a pair of pins 178 and 179 held in position respectively by a cotter pin 180 and a more easily releasable spring pin 181. The pin 178 also secures the plates 175 and 176 to a first hollow square member 183 rotatably secured to a second hollow square member 185 by a bolt 187 and nut 188 which provide a pivotal connection between square members 183 and 185. One side of square member 185 is engaged by the pivotal connection and the opposite side carries a hook-like projection 190, which fits sideways through any one of three slots 192, 193 and 194 in an end piece 196 of the extensible stabilizer tube 156. The slot selected depends on the desired height of the stabilizer yoke 158 at the time of its attachment to the skid 19. To attach the yoke 158 to the end piece 196, the hook 190 is slipped sideways through the selected slot and then rotated by 90 degrees to engage the lower edge portion of the slot, thereby securing the yoke to the end of the stabilizer tube.

Attachment of the lift assembly and the stabilizer assembly to the helicopter skids and subsequent lifting of the helicopter to an elevated position may be understood best from the following explanation in conjunction with FIGS. 1 and 9–11. In readying vehicle 17 for use, the skid lifting yokes, such as yokes 125, 125, that match the particular helicopter design are attached to pins 126 at the distal ends of the lift assembly arms. The vehicle 17 is then positioned for use by using controller 72 to maneuver it under the helicopter and between the skids, preferably from the rear of the helicopter and parallel to the skids as shown in FIG. 1. The lifting yokes 125, 125 then engage the skids 19, 19 by extending the telescoped lift tube extensions 120 and inserting the wheel mounting studs 127, 129 on the skids into the slotted apertures 136 in the lifting yokes.

The hydraulic lifting device is then operated to tilt the helicopter and raise a front portion of the helicopter skids clear of the ground as shown in FIG. 9 to permit extension and attachment of the yokes 158 at the ends of the telescoped stabilizer tubes 156, 156. The tilting of the helicopter to raise the front portion of the skids occurs because, in this illustration, the point of attachment of the link 133 to the lifting yoke 125 is slightly forward of the center of gravity of the helicopter. If the point of attachment is substantially at or slightly aft of the center gravity, then the helicopter may be easily tilted downward at the rear to raise the front portion of the skids for attachment of the stabilizer yokes.

After the stabilizer tubes 156 are attached to the skids as shown in FIG. 10, the hydraulic lifting mechanism is again operated to lift the helicopter skids entirely clear of the ground and into an elevated position for transport as shown in FIG. 11. In this transport position of the helicopter, the attached stabilizer assembly serves as an anti-teetering device for steadying the helicopter while it is moved over the ground or deck, or into a hangar or other building.

Figure 5:
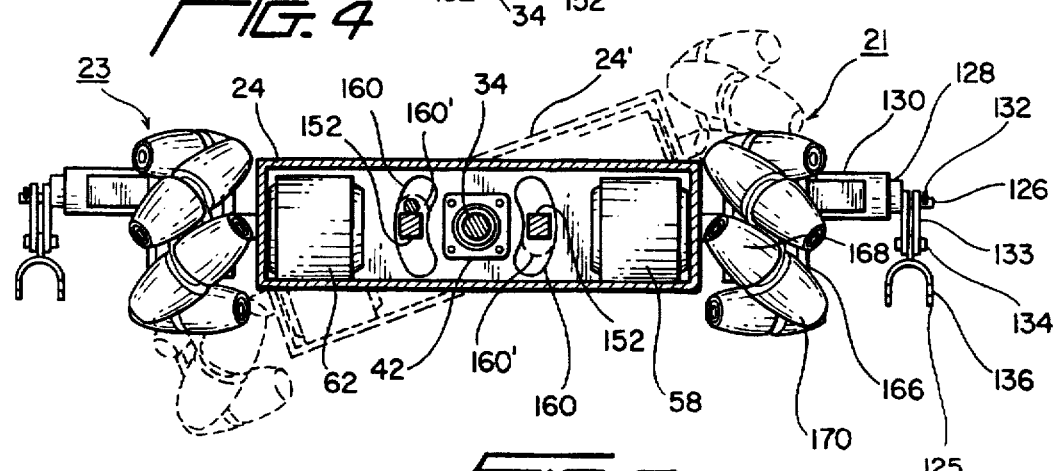
FIG. 5 is an elevational sectional view taken transversely along lines 5—5 of FIG. 2.

As may be seen best in FIG. 5, a pair of arc-shaped slots 160, 160 are provided in the center rear wall of front chassis 22 to permit the previously described pivotal movement between the front chassis and the rear chassis around pivot axle 34, the slots 160, 160 being necessary for such pivotal movement since the stabilizer support bars 152, 152 are fixed to the rear chassis 26 and therefore must be movable relative to the front chassis 22. Furthermore, the rotational movement provided by the pivotal axle and its respective bearings is limited to relative pivotal movement between the front and rear chassis by engagement between the bars 152, 152 and the respective ends of slots 160, 160.

Referring now to FIGS. 2, 5 and 12, and as previously described, the helicopter handler of the present invention employs four omnidirectional wheels 21, 23, 25 and 27, each of which comprises a plurality of elongated ground engaging rollers 164, the surfaces of which are convexly vaulted in the longitudinal (axial) direction. Each roller is mounted with its axis extending obliquely with respect to the axis of rotation of the hub 166, which is defined by the respective driving axles 59, 63, 86 and 92. As described more fully in U.S. Pat. No. 3,876,255, each roller 164 preferably comprises two parts 168 and 170 secured together by an axial shaft (not shown) mounted in a bearing (not shown), which in turn is secured within an aperture 171 through a central flange 172.

As described more fully in U.S. Pat. No. 3,746,112, the rollers of the omnidirectional wheels are mounted obliquely at an angle to the plane of the hub, such that the direction of the roller axes on the front wheels 21 and 23 converge to the rear while the roller axes on the rear wheels 25 and 27 converge in the forward direction. As may be seen best in FIG. 12, the brackets for each roller are displaced in relation to each other on the hub so that the central axis of each roller defines an angle in the range of about 30° to about 60°, preferably about 45°, with the rotational axis of the hub 166. The angle selected between the roller axes and the hub axis is preferably substantially the same for all of the rollers. Furthermore, the mounting apertures in the brackets for receiving the central shaft of the two-part rollers, and the positioning of the brackets and thereby also the position of the rollers, is such that the outer surface of each roller defines a part of the outer periphery of the wheel.

In order for the helicopter handler to provide a smooth and bump free transport of the lifted equipment, it is preferred that the omnidirectional wheels provide an unbroken wheel periphery. For this purpose, each ground engaging element is shaped as an elongated roller having the outer surface thereof convexly vaulted in the longitudinal direction parallel to the axis of rotation of the roller.

In addition, the angle between the hub axis and the axis of each roller, the length and contour of each roller and the distance between adjacent rollers are selected in such a manner that the outer periphery of each roller, as observed from a point on an imagined outward extension of the axis of the hub and looking in the direction towards the wheel, begins where the adjacent roller terminates. Thus, the outer surfaces of adjacent rollers complement each other around the hub so that an unbroken wheel periphery is formed about the wheel, as is indicated by the wheel lines seen in the side elevations of FIGS. 6 and 9–11.

To further insure a smooth driving motion of the wheels, the rollers are preferably formed of a hard plastic material, such as polyurethane, and have a smooth outer surface as shown in FIGS. 1–2 and 5–6. Polyurethane rollers are preferred because they are virtually indestructible, never need air, and have a low rolling resistance such that the wheels roll easily. Omnidirectional wheels with rollers having smooth surfaces provide excellent traction on wet pavement, snow and ice due to the oblique angle between the roller axes and the wheel axes and the fact that these angles are in offsetting directions on opposite sides of the vehicle, such that the right and left side roller axes make an angle of about 90° relative to each other when the oblique angles are at the preferred value of 45°. Although rollers with substantially smooth outer ground engaging surfaces are preferred, traction grooves may be provided in the polyurethane body or covering of each roller as shown in the optional modification of FIG. 12.

Each of the omnidirectional wheels constitutes a driving wheel and is independently mounted and capable of individual regulation with regard to speed and direction of rotation by means of the corresponding electric motors as previously described. By reason of these omnidirectional wheels, the vehicle can be made to move in a directionally stable manner forwards, backwards and sideways, as well as in any of the intermediate azimuthal directions around the full horizon of 360°.

By reason of the omnidirectional wheels and the precision provided by computer 70, a single operator has complete control for movement of the helicopter in any direction from its initial lifted position. For example, the operator simply causes the helicopter handler to roll under the helicopter from its rear, activates the lift assembly up or down as necessary to attach the lifting and stabilizing yokes to the helicopter skids and to lift the helicopter clear of the ground, and then may move to a position near the tailboom to control movement of the helicopter in any azimuthal direction. However, the remote control module 72 allows the operator to control the self-propelled vehicle 17 and its lift assembly 110 from any location relative to the periphery of the helicopter.

The capability of loading the helicopter on the helicopter handler from the rear provides a number of advantages. These include easier alignment of the lifting fixtures 124 with the skids, and avoiding interference with front mounted lights, antennas, FLIR units and the like, and facilitating movement of the helicopter in a rearward direction (backing).

The operator's position with the controller 72 may be any where near the helicopter, whichever position permits the best visibility of the attaching, lifting and transport operations. The variable speed and directional control promotes safety in tight hangar positions or when working around or near other aircraft. If for some reason the helicopter should become disconnected from the lift assembly, the possibility of damage to the helicopter is greatly reduced because the helicopter handler is only about 10 inches high, and the operator lifts the helicopter only a few inches to clear its skids from the ground surface. Furthermore, the helicopter handler will never scar the cross tubes of a helicopter because it never touches the cross tubes, but instead attaches to the existing studs for attaching the ground handling wheels provided by the manufacturer. The combined spring action of the helicopter skids and that of the lifting arms of the lift assembly allows the helicopter handler to take a jolt, such as going over hangar door rails or uneven pavement, without adversely affecting the helicopter.

The batteries of the helicopter handler are preferably lead acid deep-cycle batteries which are rated at about 110 amp/hours and require very low maintenance. A number of auxiliary devices (not shown) may also be provided, such as a battery gauge to determine the power level of each battery, an audio warning system for sounding a warning horn when movement begins in any direction, and a work area lighting system for dark handling areas.

Although the helicopter handler is capable of lifting helicopters weighing in excess of 10,000 pounds, it is a compact unit of relatively small size and therefore readily positioned under helicopters with low fuselages and with relatively narrow spacing between the skids. By way of example, the overall body of the helicopter handler may have dimensions of about 42 inches wide, about 6 feet long and about 8 inches high, with the body being elevated off of the ground by the omnidirectional wheels to provide a ground clearance of about 1.5 to 2.0 inches. The lift tube 112, the transverse tube 118, the extension tubes 120, 120 and the lever arms 122, 122 preferably have rectangular cross sections. The length of the lift tube may be about 34 inches, the length of the transverse tube may be about 48 to 60 inches, the length of each extension tube may be about 30 inches, and the length of each lever arm may be about 9 to 12 inches. With the lift assembly components sized as above, which is given by way of example, the extended width of the lift assembly is about 100 inches and the closed width is about 48 to 58 inches depending on the transverse tube length.

While the invention has been described in conjunction with the preferred embodiments thereof, many changes, modifications, alternatives and variations will be apparent to those skilled in the art when they learn of the invention. Thus, although the invention is described in conjunction with the ground handling of helicopters having landing skids, it is also applicable to handling other types of aircraft and other equipment supportable on the ground by at least one ground engaging member. For example, the lift assembly may be reconfigured for attachment to a wheel type landing gear, such as by shortening the transverse arms and directing the yoke engaging pins 126 inward to instead engage corresponding receptacles at opposite ends of the axle of a landing gear wheel. Accordingly, the preferred embodiments of the invention set forth above are intended to be illustrative, not limiting, and various changes may be made without departing from the spirit and scope of the invention as defined by the claims set forth below.

What is claimed is:

1. A vehicle for ground handling of equipment supportable on the ground by a pair of opposing skids each engageable by a lifting element, said vehicle comprising:

a front chassis having at least one omnidirectional wheel on each side of a longitudinal axis and arranged to support said front chassis for movement over the ground in any azimuthal direction, each of said front omnidirectional wheels comprising a rotatable front hub and a plurality of rollers secured to the periphery of the front hub with their rotational axis disposed angularly with respect to an axis of rotation of the front hub such that the roller axes of the respective front wheels intersect at a point rearwardly of the front hub axes;

a rear chassis having at least one omnidirectional wheel on each side of said longitudinal axis of said vehicle and arranged to support said rear chassis for movement over the ground in any azimuthal direction, each of said rear omnidirectional wheels comprising a rotatable rear hub and a plurality of rollers secured to the periphery of the rear hub with their rotational axis disposed angularly with respect to an axis of rotation of the rear hub such that the roller axes of the respective rear wheels intersect at a point forwardly of the rear hub axes;

pivot means for rotatably interconnecting the front chassis and rear chassis so that they are tiltable relative to each other in a plane transverse to said longitudinal axis;

a lift assembly comprising a center section of adjustable length pivotally mounted on one of said chassis for pivotable movement in a plane substantially parallel to said longitudinal axis, left and right lever arms extending in the direction of said longitudinal axis and each connected at one end to said center section and at the other end to a fitting adapted to engage said lifting element, and a lifting mechanism connected to said center section for causing said pivotal movement such that, when said fittings engage said lifting elements and said lifting elements engage said skids, said equipment may be lifted to an elevated position off of the ground by a lifting force acting substantially through the center of gravity of the equipment and enabling substantially the entire weight of the equipment to be borne by the lift assembly for transport by movement of said vehicle over the ground.

2. The vehicle of claim 1 wherein the axes of both the front and rear rollers form an angle in the range of about 30° to about 60° with respect to the rotational axis of the corresponding hub.

3. The vehicle of claim 2 wherein said angle is about 45°.

4. The vehicle of claim 1 wherein each of said wheel rollers is elongated in a longitudinal direction and has an outer ground contacting surface convexly vaulted in the longitudinal direction, and wherein the angle between the axis of each roller and the corresponding hub axis and the distance at which the rollers are positioned in relation to each other around the corresponding hub is such that the rollers, as seen from a point on an extension of the corresponding hub axis and looking in a direction towards the corresponding wheel, together define an unbroken wheel periphery.

5. The vehicle of claim 1 for use in ground handling of a helicopter with two landing skids, each skid having a fitting directly opposite the fitting of the other skid by which a wheel can be mounted on the skid for movement of the helicopter while on the ground, wherein said lifting element is adapted for attachment to said wheel fitting on each skid, and wherein the engagement between said lifting elements and the lift fittings of said lift assembly enables the helicopter to be lifted and transported by movement of said vehicle without any of said skid wheels being attached to the skids.

6. The vehicle of claim 1 wherein each of said opposing skids is engageable by a stabilizing element, and wherein said vehicle further comprises a stabilizer assembly of adjustable length mounted on said one chassis and including means for engaging said stabilizing element to prevent fore/aft teetering of said equipment when in said elevated position.

7. The vehicle of claim 6 wherein said stabilizer assembly and said lift assembly are mounted on said rear chassis.

8. The vehicle of claim 7 wherein said stabilizer assembly comprises a central support section fixedly attached to said rear chassis by support means extending through said front chassis, and left and right extensible arms extending away from said longitudinal axis and each connected at one end to said support section and at the other end to a fitting adapted to engage said stabilizing element.

9. The vehicle of claim 1 wherein said center section of adjustable length comprises a support tube pivotally mounted on said one chassis for said pivotable movement and at least one extension tube telescoped within said support tube for extensible movement relative thereto, wherein a distal end portion of said extension tube is connected to a corresponding one of said lever arms, and wherein said lifting mechanism comprises an hydraulic piston and cylinder unit having one end pivotally connected to said support tube and another end pivotally connected to said one chassis.

10. The vehicle of claim 9 wherein said hydraulic unit comprises a piston rod with a distal end pivotally connected to said support tube and an hydraulic cylinder with a distal end pivotally connected to said chassis, a proximate end of said piston rod being connected to a proximate end of said cylinder.

11. The vehicle of claim 1 wherein each of said wheel rollers comprises two parts and said parts are disposed on a common rotational axis on opposite sides of a bracket supporting the roller.

12. The vehicle of claim 1 wherein said transverse plane is perpendicular to said longitudinal axis.

13. The vehicle of claim 1 further comprising at least four independent drive motors one for each of said at least four omnidirectional wheels, each of said drive motors being operable independently of the other drive motors and connected for driving a corresponding one of said omnidirectional wheels such that said omnidirectional wheels are capable of individual regulation with regard to speed and direction of rotation so that the vehicle can be made to move in a directionally stable manner forwards, backwards, sideways, and in directions intermediate therebetween.

14. The vehicle of claim 1 wherein one of said chassis has a U-shaped frame with opposing legs extending outwardly from a base to define a space bounded by said base and opposing legs, and the other of said chassis has a frame with a base portion and a neck portion extending longitudinally from one end of said base portion, and wherein said neck portion is positioned in said space and rotatably connected to the base of said U-shaped frame such that said U-shaped frame is capable of pivotal movement around said neck.

15. The vehicle of claim 1 wherein each of said opposing skids is engageable by a corresponding stabilizing element; wherein a stabilizer assembly of adjustable length is mounted on said rear chassis and is arranged to engage each of said stabilizing elements; and wherein said stabilizer assembly comprises a central support section fixedly attached to said rear chassis by support means extending through said front chassis, and left and right extensible arms extending perpendicular to said longitudinal axis and each connected at one end to said support section and at the other end to a fitting adapted to engage a corresponding one of said stabilizing elements.

16. A vehicle for ground handling of equipment supportable on the ground by at least one ground engaging member engageable by a lifting element, said vehicle comprising:

a front chassis having at least one omnidirectional wheel on each side of a longitudinal axis and arranged to support said front chassis for movement over the ground in any azimuthal direction, each of said front omnidirectional wheels comprising a rotatable front hub and a plurality of rollers secured to the periphery of the front hub with their rotational axis disposed angularly with respect to an axis of rotation of the front hub such that the roller axes of the respective front wheels intersect at a point rearwardly of the front hub axes;

a rear chassis having at least one omnidirectional wheel on each side of said longitudinal axis of said vehicle and arranged to support said rear chassis for movement over the ground in any azimuthal direction, each of said rear omnidirectional wheels comprising a rotatable rear hub and a plurality of rollers secured to the periphery of the rear hub with their rotational axis disposed angularly with respect to an axis of rotation of the rear hub such that the roller axes of the respective rear wheels intersect at a point forwardly of the rear hub axes;

pivot means for rotatably interconnecting the front chassis and rear chassis so that they are tiltable relative to each other in a plane transverse to said longitudinal axis;

a lift assembly comprising a center section of adjustable length pivotally mounted on one of said chassis for pivotable movement in a plane substantially parallel to said longitudinal axis, left and right lever arms extending in the direction of said longitudinal axis and each connected at one end to said center section and at the other end to said lifting element, and a lifting mechanism connected to said center section for causing said pivotal movement such that, when said ground engaging member is engaged by said lifting element, said equipment may be lifted to an elevated position off of the ground by a lifting force acting substantially through the center of gravity of the equipment and enabling substantially the entire weight of the equipment to be borne by the lift assembly for transport by movement of said vehicle over the ground.

17. The vehicle of claim 1 for use in ground handling of a helicopter with two landing skids, each skid having a wheel fitting directly opposite the wheel fitting of the other skid by which a wheel can be mounted on the skid for movement of the helicopter while on the ground, wherein said lifting element is adapted for engaging said wheel fitting on each skid, and wherein the engagement between said lifting elements and said wheel fittings enables the helicopter to be lifted and transported by movement of said vehicle without any of said skid wheels being attached to the skids.

18. The vehicle of claim 17 wherein each of said opposing skids is engageable by a stabilizing element, and wherein said vehicle further comprises a stabilizer assembly of adjustable length mounted on said one chassis and including means for engaging said stabilizing element to prevent fore/aft teetering of said helicopter when in said elevated position.

19. The vehicle of claim 18 wherein said stabilizer assembly and said lift assembly are mounted on said rear chassis.

20. The vehicle of claim 19 wherein said stabilizer assembly comprises a central support section fixedly attached to said rear chassis by support means extending through said front chassis, and left and right extensible arms extending away from said longitudinal axis and each connected at one end to said support section and at the other end to a fitting adapted to engage said stabilizing element.

21. The vehicle of claim 16 wherein said center section of adjustable length comprises a support tube pivotally mounted on said one chassis for said pivotable movement and at least one extension tube telescoped within said support tube for extensible movement relative thereto, wherein a distal end portion of said extension tube is connected to a corresponding one of said lever arms, and wherein said lifting mechanism comprises an hydraulic piston and cylinder unit having one end pivotally connected to said support tube and another end pivotally connected to said one chassis.

22. The vehicle of claim 21 wherein said hydraulic unit comprises a piston rod with a distal end pivotally connected to said support tube and an hydraulic cylinder with a distal end pivotally connected to said chassis, a proximate end of said piston rod being connected to a proximate end of said cylinder.

23. The vehicle of claim 16 wherein said transverse plane is perpendicular to said longitudinal axis.

24. The vehicle of claim 16 wherein one of said chassis has a U-shaped frame with opposing legs extending outwardly from a base to define a space bounded by said base and opposing legs, and the other of said chassis has a frame with a base portion and a neck portion extending longitudinally from one end of said base portion, and wherein said neck portion is positioned in said space and rotatably connected to the base of said U-shaped frame such that said U-shaped frame is capable of pivotal movement around said neck.

* * * * *